INVENTORS
LYNN W. STAPLES
RAYMOND D. STROUT

INVENTORS
LYNN W. STAPLES
RAYMOND D. STROUT

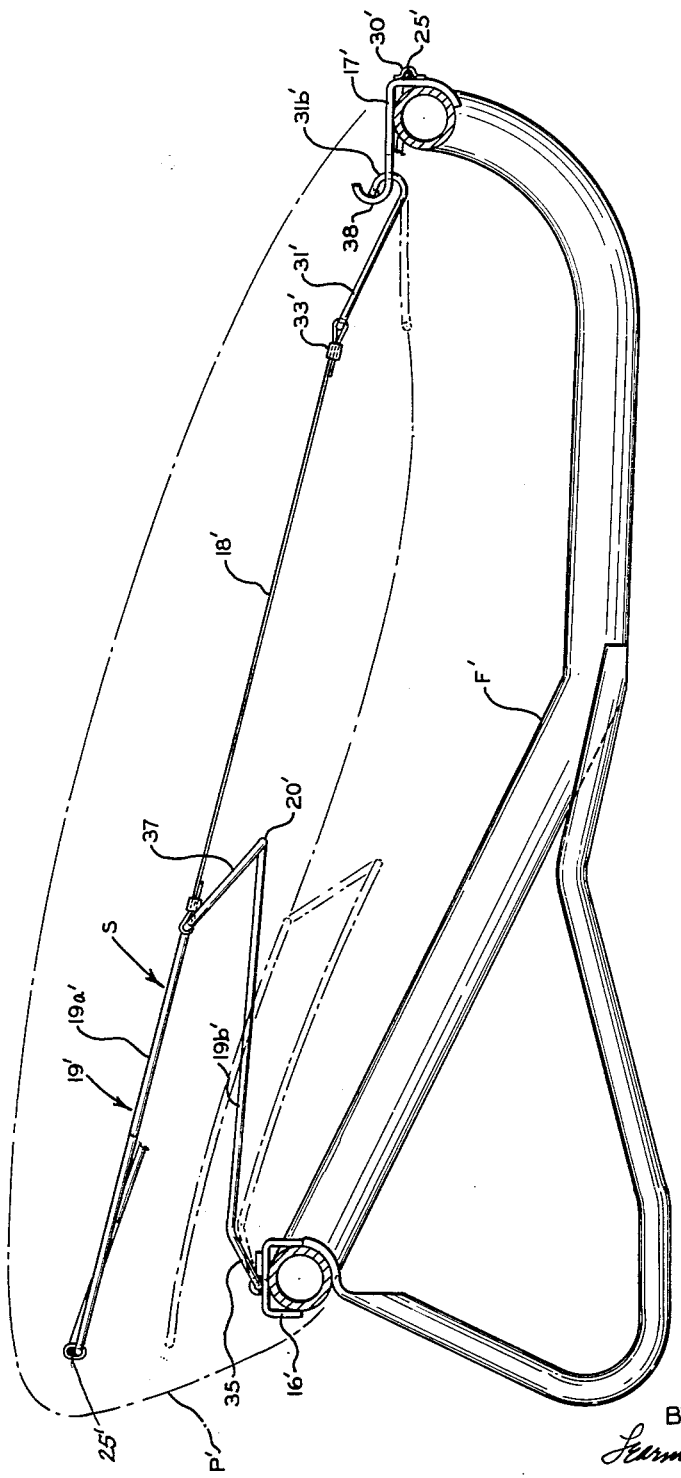

United States Patent Office 3,039,763
Patented June 19, 1962

3,039,763
SPRING STRUCTURES, PARTICULARLY FOR VEHICLE SEATS AND BACKS
Lynn W. Staples and Raymond D. Strout, Saginaw, Mich., assignors to Saginaw Wire Products, Inc., Bridgeport, Mich., a corporation of Michigan
Filed Nov. 26, 1958, Ser. No. 776,524
19 Claims. (Cl. 267—107)

This invention relates to spring structures and more particularly to springs which are employed in vehicle seats and backs and assume a predetermined contour under load.

While elastic cords and the like have been used in the furniture industry as elongatable support members, particularly in association with canvas and other fabric seats, similar units incorporating them have not, to our knowledge, been employed as vehicle seat and back assemblies because they have not been capable of assuming the desired contour when a load is applied. In prior furniture constructions of which we are aware, the elastic members are connected at their ends to rigid front and rear rail members and the seats are relatively hard from the standpoint of "feel," particularly at the front of the seat where the thighs engage the front rail member. Constructions of this type are not suitable for vehicle seat assemblies which must provide a maximum degree of riding comfort for extended periods of time on long trips, and no one has, until the instant invention was perfected, to our knowledge, designed a satisfactory vehicle seat construction in which rubber straps or the like are employed as load supporting members.

Seat assemblies which employ rubber strap, deck section members are in some ways more desirable than the sinuous type wire springs which are conventionally used. With springs assemblies of the character which will be described, there is less rebound following a road shock which drives an occupant deeper into the seat and this factor is, of course, of considerable importance in the design of truck seats, since considerable road shock is transmitted to the chassis members of most trucks. Further, because the propensity of modern passenger vehicle manufacturers is to decrease the height of automobiles, which necessitates holding head room at a minimum, the rebound factor is one which is also being carefully considered in automobile design. Additionally some difference in "feel" has been noted with seat assemblies employing fabric rubber straps of the type which will be described, since the straps can conform to the shape of the body and accommodate to pressure points along the contour better than the relatively stiff sinuous wire springs.

It is a prime object of the instant invention to provide a spring structure for vehicle seat and back assemblies which achieves a comparably low rebound factor but does so without sacrificing comfort. Thus it is important to design front strap support members which provide a controlled deflection of the spring structures under the weight of the seat occupant. It is also important that the spring structure be so designed that the buttocks support area at the rear of the seat moves substantially vertically down under the jounce of an occupant, rather than down at a forwardly inclined angle which produces an undesirable and uncomfortable chafing on long rides.

Another important object of the invention is to provide a seat which has a high degree of what is termed "feel." This is accomplished in the instant invention by providing a "drop-in" effect. The "feel" is enhanced because the occupant is permitted to settle a predetermined distance into the seat without any appreciable resistance to settling at the buttocks. The resistance to further settling is, of course, gradually increased as the occupant settles deeper into the seat, however, the occupant has the pleasant sensation of sinking comfortably into the seat.

It is a further object of the invention to design a spring structure which can overhang its front rail support member so that the front and rear rail support members can be more closely spaced with a consequent saving in material and space. Such a construction further lends itself to the formation of a convex front seat edge when the padding and covering fabric are secured in place.

Another object of the invention is to provide a construction which permits a very simple and ready adjustment of the drop-in effect in the design of spring structures.

A still further object of the invention is to provide a reliable and durable spring structure for vehicle seats and backs particularly, which can be economically manufactured and assembled.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawing:

FIGURE 4 is a sectional, side elevational view thereof.

Figure 1:
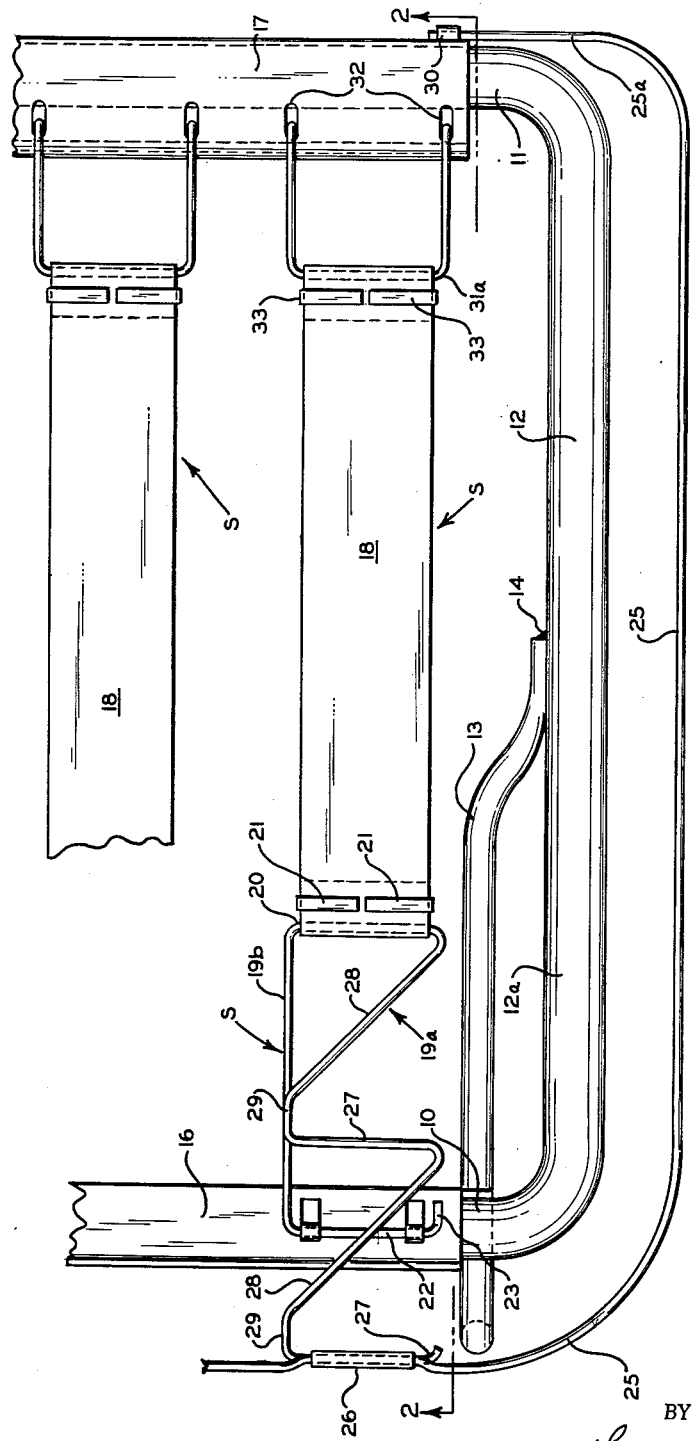
FIGURE 1 is a fragmentary, top plan view of a vehicle seat constructed in accordance with the invention.
Figure 2:
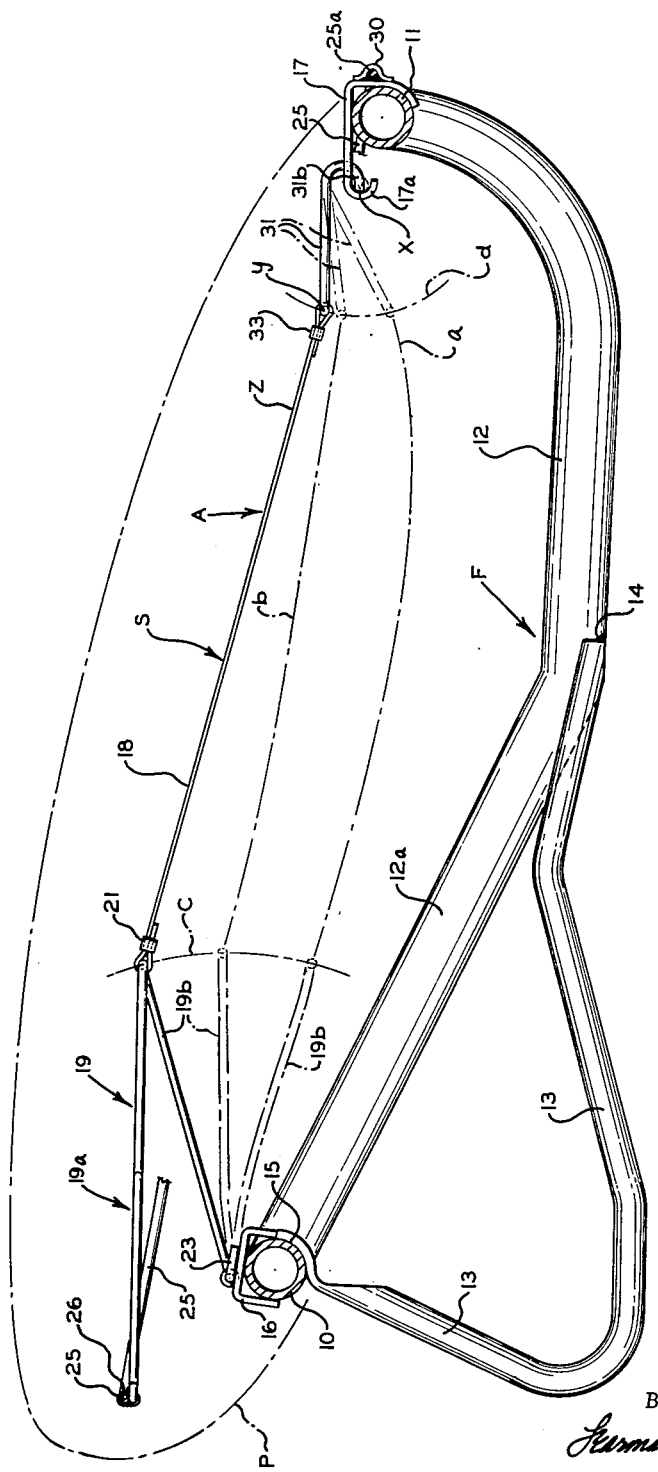
FIGURE 2 is a sectional, side elevational view taken on the line 2—2 of FIGURE 1, the diagrammatic lines indicating deflected positions of the spring structures under load and the arcs of travel of certain portions of the structures.

Referring now more particularly to FIGURES 1 and 2 of the accompanying drawings, a letter F generally indicates a vehicle seat frame which is formed for strength and rigidity of tubular stock shaped to provide a front support section 10, a rear support section 11, and side sections 12 which have upwardly angled portions 12a, as shown. Angular front support members 13 are welded to the frame side members 12 as at 14 and to the front support section 10 at 15, and longitudinally extending channel members 16 are welded to the upper surface of front frame member 10 to provide a spring structure support having a conveniently flat surface. At the rear of the seat a longitudinally extending, angular member 17 is welded or otherwise suitably fixed to rear frame member 11 to provide a suitable support for the rear end of the spring structure S which will presently be described. It is to be understood that the frame which has been described thus far is conventional and forms no part of the instant invention. The seat frame with which the spring structure is employed could be of entirely different construction or a back frame could have been illustrated as well. In FIGURE 1 only one end of the seat is shown in plan but, of course, the opposite end is exactly the same and five to ten springs S are usually employed in the seat.

The spring structures S, which are arranged in side-by-side relation (FIGURE 1) in the usual fashion over the length of the frame F, have deck sections which are in part formed by elastic, rubberized webbing straps 18 and in part by the upper leg sections 19a of resilient, wire support members which are generally designated 19. The straps 18 are preferably of multiple rubber ply, embedded fabric cord construction and preferably are of a stretchable, flexible nature. It is to be understood that it is not intended that the invention be limited to any particular elastic or resilient material, since we believe that various rubber compositions and the like are suitable for the purpose. The metallic wire spring members 19 include divergent, lower leg sections 19b, which are connected to the upper leg sections 19a by laterally disposed torsion bars 20 and it is to these torsion bars that the looped over front ends of rubber straps 18 are clipped as at 21.

Provided on the lower leg section 19b of each spring member 19 is an end torsion bar 22 (FIGURE 1) having a terminal leg portion 23 which is angularly offset with respect to the plane of extent of leg section 19b as shown in FIGURE 2 and resiliently maintains the position of the spring structure S when the seat is free of load. When a downward pressure is applied to the springs S, leg sections 19b are depressed and the load is torsionally resisted by the torsion bar 22 which is torsionally anchored by leg 23. The upper leg section 19a of each spring 19 extends forwardly of the channel member 16 in overhung relationship therewith and is connected to the usual border wire 25 by clip members 26, the configured leg sections 19a being formed of torsion bars 27 joined by diagonal bars 28 and longitudinal bar portions 29. The configuration of leg sections 19a is such as to provide the forepart of the deck section of the spring structure S with a predetermined thigh pressure resistance and contour under load, and is particularly well suited to supporting the usual seat padding and seat covering fabric P which covers the spring structures S. The "softness" of this portion of the deck section can be changed by varying the length of torsion bars 27 or the angle of diagonal bars 28. The border wire 25 is a continuous, U-shaped wire having rear end sections 25a which are pivotally received by tunnel members 30 provided on the rear face of rear spring support angle 17. The usual side brace wires, tie wires, and the like may be provided along the side sections of the border wire 25 in the usual manner but these wires are omitted from the drawings in the interests of clarity.

Provided in each rear angle strip 17 forwardly of frame section 11 is a vertically curvilinear, dependent flange section 17a which forms a pivotal socket support for the hanger members 31 which connect the rear ends of elastic straps 18 to the frame F. Each hanger member 31 is generally U-shaped (FIGURE 1) and has a laterally disposed bar portion 31a opposite reversely turned terminal hook sections 31b which are pivotally received by the socket section 17a of rear support strip 17, the ends 31b extending down through suitably spaced apart, elongate or annular openings 32 provided in strip 17. The looped over rear ends of strap members 18 are also clipped as at 33 and thus the front and rear ends of straps 18 are pivotally secured or hinged to members 19 and 31, respectively, which are themselves pivotally or flexibly supported by the frame structure F. Only the terminal edge portions of the hook sections 31b of hangers 31 engage the socket flange 17a, so that the position of hooks 31b is vertically shiftable in socket 17a and the effect of the pivoting of hanger members 31 is to drop the rear ends of the straps 18 substantially vertically. Because the hook sections 31b are engaged only at their terminal ends, the hook sections themselves can move vertically in the section 17a and will do so to maintain an alignment between the points of engagement of the hooks with the socket which supports them, the points of connection of the hooks 31 with the bands 18, and the direction of the pulling force exerted by the straps 18 under load. For instance, in FIGURE 2 points x, y and z are in alignment in all conditions of deflection of the spring structure S, the point "y" dropping off as necessary to maintain the alignment as point "x" moves. Normally, most of the weight of the occupant is, of course, applied to a seat at a point approximately two thirds of the distance from the front section of the border wire to the rear frame member at what is called the "A" point, (FIGURE 2) where the buttocks engage the seat. If the rear ends of bands 18 can move substantially vertically, or vertically and rearwardly, the chafing effect which arises in a seat in which the rear ends of the deck section move forwardly and vertically under load is obviated. In the instant case, when an occupant is seated in the seat the sections 31a of the hangers 31 are in the position indicated by the diagrammatic lines "a" at a time when the hangers 31 are moving in an arc rearwardly of the position in which they are shown in solid lines in FIGURE 2, as well as downwardly.

With the "drop-in" effect provided, an occupant can move into the seat a distance which may be three inches or so when he first sits down, without encountering appreciable resistance in the portion of the deck section which is adjacent to the "A" point as shown in FIGURE 2. It will be noted that the spaced distance between the torsion bars 20 of front springs 19 and bars 31a of hangers 31 is greater when the spring structure S is in unloaded condition, as it is depicted in solid lines in FIGURE 2, than when it is in the position indicated by diagrammatic lines "b." Thus, if in unloaded condition the end 23 of spring support section 19 is so arranged angularly to the lower leg section 19b that strap 18 has a 10% elongation or stretch in unloaded condition, it will be seen that under load when strap 18 reaches position "b" strap 18 will be slacked and offer no greater and actually less resistance to settling of the buttocks at the "A" point. When position "a" is reached, the strap 18 will have been elongated, because at this point in the respective arcs "c" and "d" of the leg section 19b and hanger 31, the bars 20 and 31a will be moving further apart, rather than closer together as in the first stages of the deflection. Of course, arc "d" is not a true arc, because of some movement of the ends 31b of rear hangers 31 vertically in the socket 17a. As the occupant descends in the seat beyond position "b" where formation of contour is assisted by the slacking effect and approaches position "a," the elastic straps 18 are gradually stretched and comfortably resist the weight of the occupant. The desired "drop-in" effect can be varied by slightly changing the lengths of hangers 31 relative to the lengths of leg sections 19b, because the sooner rearward swing of hangers 31, when the spring structures are being deflected, will not be offset by the forward swing of sections 19b which travel in a more gradual arc.

It has been found that rebound is minimized in seats employing the rubber strap construction of the instant invention. One of the principal reasons is believed to be the hysteresis which occurs within the straps. Further, the fact that the pivotally supported ends of the bands 18 are attached to yieldable members and move vertically in the manner indicated is believed important to the minimization of rebound, because deflection is not a matter of simply stretching an elastic member. Because straps 18 are connected to the torsion bars 20 of spring support sections 19, pivoting occurs about torsion bars 22 and the elongation as a result of the main load occurs in the straps rather than the leg sections 19a which bear for the most part the localized load of the thighs and pivot about torsion bars 20. The seat construction of the instant invention is ideal for truck seats particularly and in tests which have been made has proved very comfortable and otherwise highly satisfactory.

Figure 3:
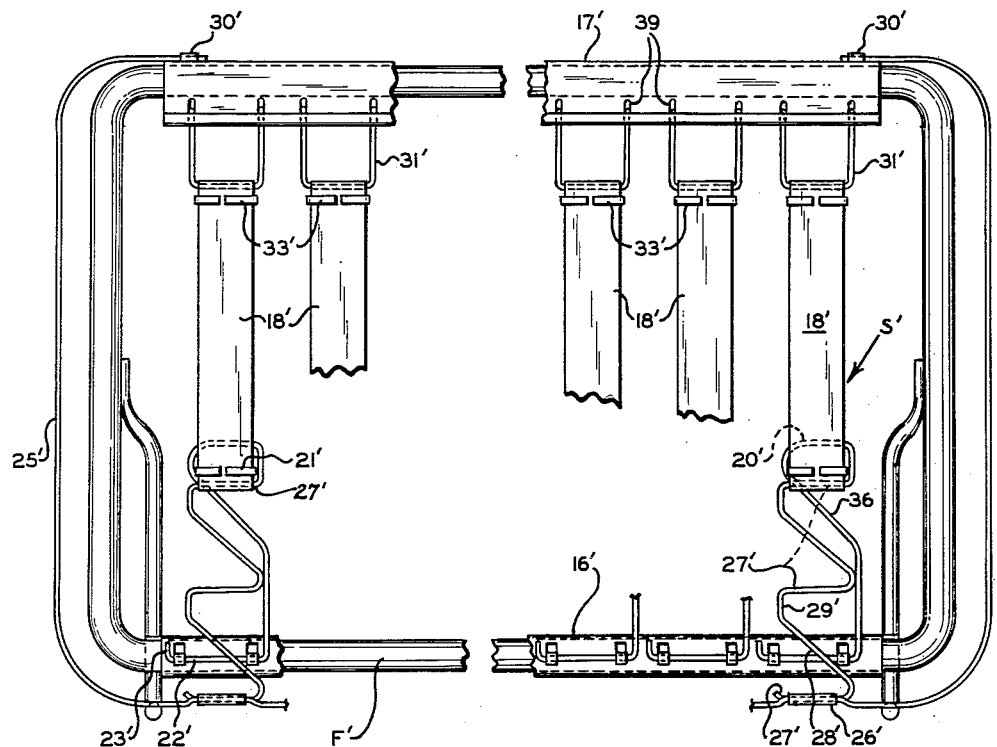
FIGURE 3 is a top, plan view of a modified seat assembly constructed in accordance with the invention.

In FIGURES 3 and 4 we have shown a modification of the spring assembly which is identical with the seat assembly described except for certain differences which will be treated. The frame F' depicted in FIGURE 4 is identical and front and rear members 16' and 17' are mounted on the frame as previously. Provided on the rear frame member 17' are tunnel members 30' as in the embodiment of the invention shown in FIGURES 1 and 2 for pivotally supporting a U-shaped border wire 25'. The spring structures S' similarly comprise rubber straps 18', front wire support members 19', and hanger members 31' which pivotally join the rear ends of strap members 18' to the rear rail member 17'.

The lower leg sections 19b' of the front wire supports 19' again include the end torsion bars 22' with terminal leg portions 23', however, in this embodiment they also include upwardly angled portions 35 joining the end torsion bars 22' to the adjacent portions of leg sections 19b', and the adjacent portions thereof include diagonally disposed bars 36 which connect with the torsion bars 20' joining lower leg sections 19b' and upper leg sections 19a'. Each of the upper leg sections 19a' of the wire support members 19' is formed as before of torsion bars 27' joined by diagonal bars 28' and longitudinal bar portions 29', and the upper end torsion bar portions 27' are similarly connected to indented portions of the border wire 25' by the clip members 26'. The torsion bar 27' immediately adjacent torsion bar 20' of each leg section 19a' is connected to the torsion bar 20' by a section 37 which is more acutely angled than the remaining portion of the leg section 19a', as will be noted, and the front ends of rubber straps 18' are pivotally connected, not to torsion bars 20' as before, but to the immediately adjacent torsion bars 27' instead. Clip members 21' are provided, as previously, to clip the turned over ends of straps 18'.

At the rear ends of the straps 18 the hanger members 31' are reversed in position and are similarly received by the rear frame member 17'. Instead of the socket portion being dependent from rear frame member 17', as in the previously described embodiment of the invention, however the socket portion 38 formed in the rear frame member 17' is curved upwardly and the hook portions 31b' on hanger members 31' extend through openings 39 in the flange portion 38 as shown. The seat assembly shown in FIGURES 3 and 4 reacts in substantially the same way to the weight of a seat occupant, however, because straps 18' are secured to the particular torsion bars 27' as shown, the contour at the points of connection of the straps is smoothed out and no ridges are formed which would tend to exert localized pressures on the thighs of the occupant. With the spring structures of FIGURES 3 and 4 a flatter contour is obtained which will, of course, be more desirable for certain applications, although possibly not as suitable for other applications.

It is to be understood that various changes may be made in the various elements which comprise the invention to accomplish the same or equivalent results within the spirit of the invention and the scope of the appended claims. Various descriptive terminology is employed which is to be accorded a broad interpretation. For instance, use of the term "fabric" to designate the rubber straps is considered descriptive of members which are formed only of rubber or the like, as well as elastic webbing, woven plastic and canvas.

What we claim is:

1. In a spring structure; a spring having an elongatable, resilient rubber strap deck section; and relatively movable means, supporting said deck section in a non-load position in substantially taut condition, moving relatively toward one another to cause lengthwise slacking of said deck section upon application of a load in the initial stages of deflection as said deck section assumes a contour under load to provide a "drop-in" feel, and thence moving relatively apart to cause a stretching of said deck section resistive to continued deformation as said contour deepens with continued deflection.

2. In a spring structure supported by transversely spaced front and rear frame support sections; an elongatable, resilient rubber strap deck section extending from one frame support section toward the other; relatively movable spaced apart end supports near the ends of said deck section and connected with said frame support sections, supporting said deck section in a non-load position and resisting contouring of said deck section when a load is applied to the deck section, moving when a load is applied to said deck section but remaining in the initial stages of deflection at least no further apart as the deck section deflects under load to provide a "drop-in" effect, and thence moving apart and causing a resisted elongation of said deck section as deflection of said deck section continues.

3. In a spring assembly; spaced apart frame support sections; a spring structure including a rubber strap comprising a deck portion extending from one support section toward the other; and resilient end support means for the deck portion, supporting said ends of the strap from said sections and resisting a load applied to the deck portion, movable through a path of travel upon application of load which initially supports the ends of the strap at least no further apart for a time to provide a "drop-in" effect and thence elongates said strap upon further deflection of said structure under load.

4. In a spring assembly for a pair of spaced apart, longitudinally extending frame sections; a weight supporting spring structure having a load supporting deck section extending crosswise to said frame sections a spaced distance outward thereof; said spring structure including a stretchable, elastic rubber band forming at least a part of said deck section; compressible, resilient spring means secured to one end of said band including a section extending from the plane of said band toward one of said frame sections and supporting said band from said one of said frame sections; and means separate from said spring means connecting said band to the other of said frame sections.

5. In a spring assembly having; a pair of transversely spaced apart, frame support sections; a plurality of spring structures, having weight supporting deck sections, extending transversely to said sections in side-by-side relation and mounted on said frame support sections with the deck sections having contour assuming movement under load relative to said frame sections; a border wire for connecting said spring structures at at least one end supported for movement with said deck sections under load relative to said frame sections; the combination in which said spring structures include stretchable resilient rubber bands extending transversely to said frame sections; deflectable resilient spring means connecting said bands at one end to said border wire and to one of said frame support sections; and means separate from said spring means connecting said bands at the other end to the other frame support section.

6. In a spring assembly for a pair of transversely spaced apart front and rear frame support sections; a spring structure having a load supporting deck extending transversely to said frame sections; a compressible, resilient spring for supporting said deck on one of said frame sections; said deck including a separate deformable section connected to said spring intermediate the ends of said spring; and means connecting said latter section to the other frame support section.

7. The combination defined in claim 6 in which said spring comprises at least a pair of divergent wire leg sections connected by a torsion bar; one of said leg sections being connected to the front frame support section and said deformable section of the deck being connected to said torsion bar.

8. The combination defined in claim 7 in which said other leg section is formed of spaced apart torsion bars.

9. In a spring assembly for a pair of transversely spaced apart, frame support sections; a spring structure having a load supporting deck section extending transversely to said sections; and supporting arm means separate from said deck section hinged to each end of said deck section and having pivotal movement in an arcuate path from said frame sections as a fulcrum under a load applied to said deck section; at least one of said arm means being a spring portion resiliently returned when the load is relieved to restore said deck section to original position.

10. The combination defined in claim 9 in which said supporting arm means in initial stages of deflection both travel in downwardly and inwardly arcuate paths.

11. In a spring assembly for a pair of transversely spaced front and rear frame members; a spring structure including a rubber band deck section extending from one member toward the other member; a resilient spring portion supporting the front end of said deck section from said front member; a hanger member connected to the rear end of the deck section having a reversely bent terminal portion in the vertical plane of the deck section; and a socket formed in said rear member on which the terminal end of said reversely bent portion is received providing pivoting of the terminal end of said hanger member in a vertical plane about said socket which lowers said rear end of the deck section substantially vertically.

12. In a spring assembly for a pair of transversely spaced front and rear frame members; a spring structure including a rubber band deck section supported at its front end above said front member on a wire section having divergent compressible leg portions; and a rigid hanger member hingedly connected to the rear end of said deck section and supported by the rear frame member for pivotal movement in a vertical plane effecting pivoting of the rear end of the deck section downwardly in a vertical plane on the arc of travel of the hanger.

13. In a spring structure for supporting the weight of a seat or back occupant between a pair of front and rear frame sections; a deck section including an elongate, elastic, rubber strap; a resilient end support section for supporting the front end of said strap from said front frame section comprising a pair of diverging leg sections joined by a torsion bar; means joining said strap at one end to said torsion bar; and means for pivotally joining the other end of the strap to the rear frame section.

14. In a spring assembly having a pair of transversely spaced apart front and rear frame support members; a plurality of spring structures, having weight supporting deck sections extending transversely to said members in side-by-side relation mounted on said support members with the deck sections having contour assuming, deflecting movement under load relative to said frame members; a deformable, resilient border wire for connecting said spring structures at the front end thereof supported for movement with said deck sections under load relative to said frame members; the combination in which said spring structures include elastic rubber straps extending transversely to said frame members; spring sections for supporting the front ends of said straps from said front member comprising a pair of angularly disposed, diverging wire leg sections joined by a torsion bar; said wire leg sections having extending terminal legs bearing on said front frame member joined to a torsion bar pivotally mounted on said front frame member and extending from one of said diverging leg sections; means pivotally joining said straps at their front ends to the torsion bars connecting said divergent leg sections; and hanger members pivotally connected to the rear ends of said straps having reversely bent, hooked portions at the rear ends thereof pivotally bearing on said rear frame member; said wire hanger members and spring sections being pivotally supported to initially swing in an arc inwardly when a load is applied to the deck section so that said rubber strap portions will first be slacked to provide a "drop-in" feel prior to being elongated after a predetermined contour has been assumed and resisting deepening of the contour assumed.

15. In a spring assembly for a pair of transversely spaced apart, frame support sections; a spring structure having a load supporting deck section; an elongated, elastic band comprising at least a portion of said deck section extending transversely to said frame sections; a member secured to one of said frame support sections extending toward said deck section, and being yieldable relative to the frame support section to which it is secured, terminating at and connected to one end of said band; and separate means connecting the opposite end of said band to the other frame support section.

16. In a spring assembly having: a pair of transversely spaced apart frame support sections; a plurality of spring structures having weight supporting deck sections extending transversely to said frame support sections in side-by-side relation; a yieldable border wire for connecting said spring structures at one end; flexible, fabric bands connected to said border wire comprising at least a portion of said deck sections; and means connecting the opposite ends of said bands to the other of the frame support sections.

17. In a spring structure for supporting the weight of a seat or back occupant between a pair of front and rear frame sections; an elongate, flexible deck section; a border wire portion; a wire section for supporting the front end of said deck section above said front frame section which includes upper and lower diverging leg sections joined by a torsion section; the upper leg section including at least one laterally extending second torsion bar intermediate its ends at a spaced distance from said first mentioned torsion section and a lateral section for connection to the border wire at its upper end; means joining said deck section at its front end to said torsion bar; and means joining the rear end of said deck section to the rear frame section.

18. In a spring structure for supporting the weight of a seat or back occupant between a pair of front and rear frame sections; a deck section comprising an elastic strap; a wire section for supporting the front end of said deck section above said front frame section which includes upper and lower diverging leg sections connected by a first torsion bar; the upper leg section having also a second torsion bar joined to said first torsion bar by an upwardly inclined portion extending angularly to the general plane of extent of both leg sections; means joining said strap at its front end to said second torsion bar; and means supporting the rear end of said deck section from the rear frame section.

19. In a spring structure for supporting the weight of a seat or back occupant; a pair of spaced apart frame members; a spring, having a deck section including an elastic band and having also an end support member formed of divergent, compressible, resilient wire legs; said legs having torsion bars joining torsion bar spacing portions and connecting said deck section to one of said frame members; means joining said band at one end of said band to one of said torsion bars of said end support member to thereby support said one end of the band from said end support member; and means for supporting the other end of the band connecting it at said other end of the band to the other frame member; said elastic band being supported at its ends only so that the band can stretch as a free body substantially from end to end under load.

References Cited in the file of this patent

UNITED STATES PATENTS

| 2,421,851 | Rivard et al. | June 10, 1947 |
| 2,514,182 | Flint | July 4, 1950 |
| 2,731,075 | Flint | Jan. 17, 1956 |
| 2,830,654 | Neely | Apr. 15, 1958 |
| 2,856,989 | Pawlikowski | Oct. 28, 1958 |

FOREIGN PATENTS

| 166,091 | France | Dec. 23, 1884 |
| 397,750 | France | May 15, 1909 |